United States Patent
Dawson et al.

(10) Patent No.: US 11,361,037 B2
(45) Date of Patent: Jun. 14, 2022

(54) CONTEXTUAL SEARCH INPUT SHARING ACROSS WEBSITES

(71) Applicant: International Business Machines Corporation, Armonk, NY (US)

(72) Inventors: Emma Jane Dawson, Eastleigh (GB); Eunjin Lee, Eastleigh (GB); Ashleigh Denholm, Southampton (GB); Jack Wadsted, Southampton (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 413 days.

(21) Appl. No.: 16/194,894

(22) Filed: Nov. 19, 2018

(65) Prior Publication Data

US 2020/0159793 A1 May 21, 2020

(51) Int. Cl.
| | |
|---|---|
| *G06F 16/9532* | (2019.01) |
| *G06F 16/957* | (2019.01) |
| *G06F 16/9535* | (2019.01) |
| *G06F 16/903* | (2019.01) |
| *G06F 16/958* | (2019.01) |

(52) U.S. Cl.
CPC .... *G06F 16/9532* (2019.01); *G06F 16/90344* (2019.01); *G06F 16/958* (2019.01); *G06F 16/9535* (2019.01); *G06F 16/9574* (2019.01)

(58) Field of Classification Search
CPC .......... G06F 16/9532; G06F 16/9574; G06F 16/9535
See application file for complete search history.

(56) References Cited

U.S. PATENT DOCUMENTS

| | | | | |
|---|---|---|---|---|
| 8,650,196 | B1* | 2/2014 | Zhou | G06F 16/35 |
| | | | | 707/737 |
| 9,262,784 | B2 | 2/2016 | Shi | |
| 2002/0103799 | A1* | 8/2002 | Bradford | G06F 16/3346 |
| 2005/0027666 | A1* | 2/2005 | Beck | G06Q 30/02 |
| 2005/0060296 | A1 | 3/2005 | Whitby et al. | |
| 2006/0031102 | A1* | 2/2006 | Teller | G06Q 50/22 |
| | | | | 705/3 |
| 2006/0179111 | A1 | 8/2006 | Verona | |
| 2006/0265361 | A1 | 11/2006 | Chu | |
| 2010/0228712 | A1* | 9/2010 | Wexler | G06Q 30/0256 |
| | | | | 707/706 |
| 2010/0262918 | A1 | 10/2010 | Angell et al. | |
| 2010/0293178 | A1* | 11/2010 | Govani | G06Q 30/0256 |
| | | | | 707/759 |
| 2013/0246412 | A1* | 9/2013 | Shokouhi | G06F 16/9535 |
| | | | | 707/730 |
| 2016/0314510 | A1 | 10/2016 | Brown | |

OTHER PUBLICATIONS

"Single shopping cart for multiple e-commerce sites" https://priorart.ip.com/IPCOM/000227441, May 8, 2013 (1 page).

* cited by examiner

*Primary Examiner* — Marc S Somers
(74) *Attorney, Agent, or Firm* — Cantor Colburn LLP; Teddi Maranzano

(57) ABSTRACT

A computer system includes a processor configured to predict a level of commonality between a first website and a second website. The computer system is further configured to automatically apply cached search data input at the first website to the second website based at least in part on the level of commonality. A display unit displays the second website along with the cached search data.

12 Claims, 3 Drawing Sheets

CONTEXTUAL SEARCH INPUT SHARING ACROSS WEBSITES

BACKGROUND

The invention relates generally to online shopping interfaces, and more particularly, to product search queries input to shopping websites.

Consumer product and e-commerce corporations typically offer websites capable of allowing consumers the ability to purchase products online, i.e., over the internet. Conventional websites typically provide a series of tabs and drop down menus that allow consumers to search for available products or filter products to hone the search to a targeted product or product set. It is not uncommon for more than one company to offer similar products at different price points and/or with greater variety. Therefore, consumers typically switch between different websites when shopping for a product.

SUMMARY

According to a non-limiting embodiment, a computer system includes a processor configured to predict a level of commonality between a first website and a second website. The computer system is further configured to automatically apply cached search data input at the first website to the second website based at least in part on the level of commonality. A display unit is configured to display the second website along with the cached search data.

According to another non-limiting embodiment, a method is provided to share a contextual search input across a plurality of websites. The method comprises predicting, via a processor, a level of commonality between a first website and a second website, and automatically applying, via the processor, cached search data input at the first website to the second website based at least in part on the level of commonality. The method further comprises displaying, via a display unit, the second website along with the cached search data.

According to yet another non-limiting embodiment, a computer program product comprises a computer readable storage medium having program instructions embodied therewith. The program instructions are executable by a computer processor to cause the computer processor to perform a method of sharing a contextual search input across a plurality of websites. The method comprises predicting, via a processor, a level of commonality between a first website and a second website, and automatically applying, via the processor, cached search data input at the first website to the second website based at least in part on the level of commonality. The method further comprises displaying, via a display unit, the second website along with the cached search data.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
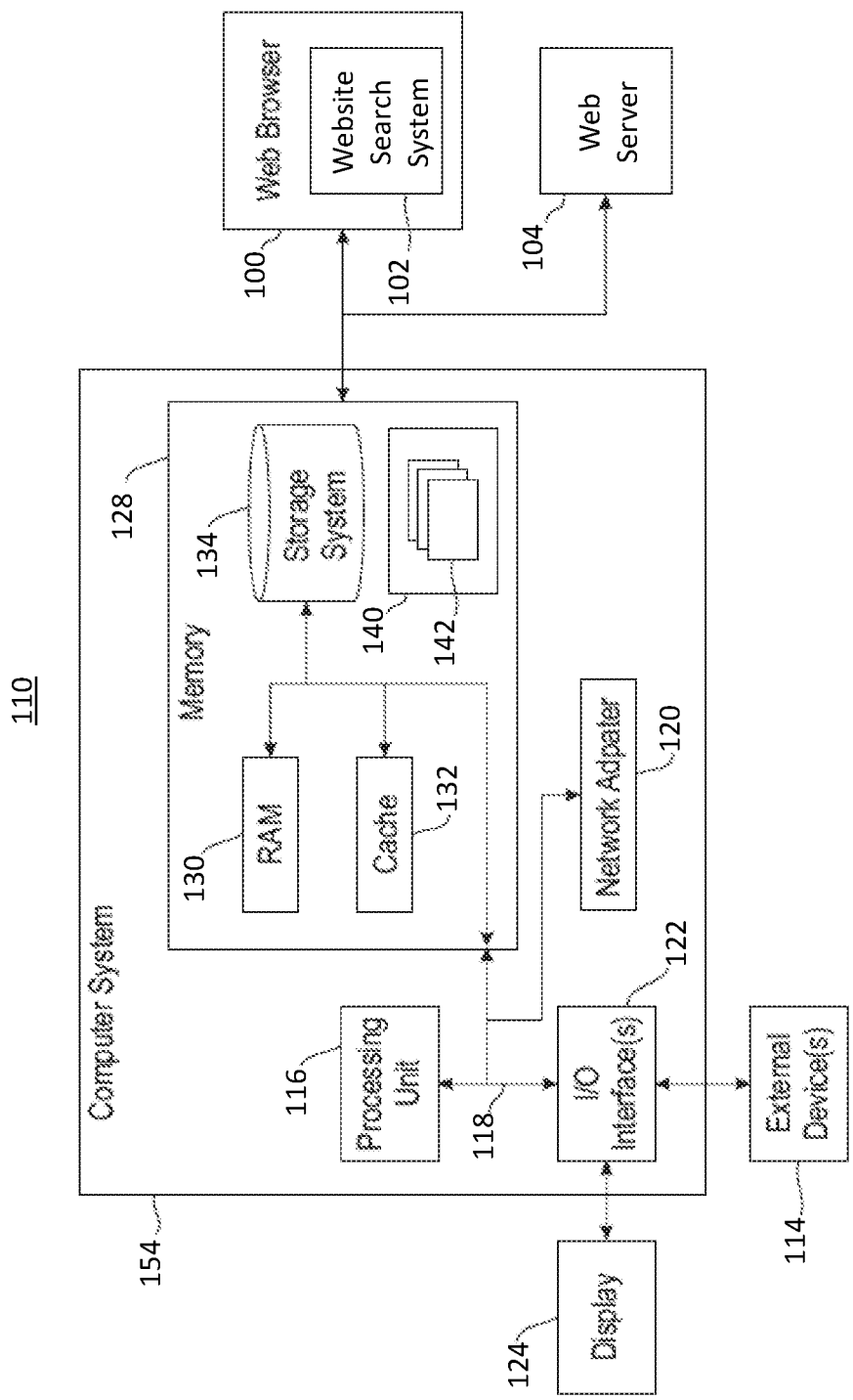
FIG. 1 is a block diagram illustrating a computer system for performing contextual search input sharing across websites according to a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to a description of technologies that are more relevant to the invention, websites have been developed to generate internet cookies, which are small pieces of data sent from a website and stored on the user's computer by a consumer's web browser while the consumer browses the internet. When performing an internet search and/or navigating through some websites, cookies can serve a reliable mechanism to remember stateful information (such as items added in the shopping cart in an online store) or to record the user's browsing activity (including clicking particular buttons, logging in, or recording which pages were visited in the past). Cookies can also be used to remember arbitrary pieces of information that the user previously entered into form fields such as names, addresses, passwords, and credit card numbers.

As described herein, consumers are known to use a variety of websites when shopping for a product to search for a lower price and/or different product style. Some conventional websites, however, are unable to track cookies or choose not to share cookies with other websites. As a result, each time a consumer moves to a different website, they must start the search again, reapplying all the filters they had used on a previous website manually.

Various non-limiting embodiments herein provide a consumer contextual website search system that shares search inputs across a plurality of websites. In at least one embodiment, the contextual website search system decides whether to share data to subsequent websites or not, based upon a dynamic context calculation using natural language.

In one or more embodiments, the consumer contextual website search system compares the context (e.g., keywords) of different shopping domains (e.g., websites) and makes a decision as to whether to automatically fill a search string applied to a first domain to one or more subsequent domains. The consumer contextual website search system enables search and filter data to be shared dynamically from one site to another if they sell similar products. When a consumer accesses a website and performs a search for a product, the consumer contextual website search system extracts the keywords of the website to determine what kind of site it is and caches the search string/filter data in a standard format for later access. If the consumer then accesses a second website within a time threshold, the consumer contextual website search system will again extract the keywords of a subsequent second domain, compare the context of the two websites and if the two contexts are a close match (e.g., have a high commonality), the consumer contextual website search system will apply the cached search input data (e.g., search strings) from the first website to the subsequently accessed website(s).

Referring now to FIG. 1, a schematic of an example of a computer system 154 in a network environment 110 is shown. The computer system 154 is only one example of a suitable computer system and is not intended to suggest any limitation as to the scope of use or functionality of embodiments of the invention described herein. Regardless, computer system 154 is capable of being implemented and/or performing any of the functionality set forth hereinabove.

In network environment 110, the computer system 154 is operational with numerous other general purpose or special purpose computing systems or configurations. Examples of well-known computing systems, environments, and/or configurations that may be suitable as embodiments of the computer system 154 include, but are not limited to, personal computer systems, server computer systems, cellular telephones, thin clients, thick clients, hand-held or laptop devices, multiprocessor systems, microprocessor-based systems, set top boxes, programmable consumer electronics, network personal computer (PCs), minicomputer systems, mainframe computer systems, and distributed cloud computing environments that include any of the above systems or devices, and the like.

Computer system 154 may be described in the general context of computer system-executable instructions, such as program modules, being executed by one or more processors of the computer system 154. Generally, program modules may include routines, programs, objects, components, logic, data structures, and so on that perform particular tasks or implement particular abstract data types. Computer system 154 may be practiced in distributed computing environments, such as cloud computing environments, where tasks are performed by remote processing devices that are linked through a communications network. In a distributed computing environment, program modules may be located in both local and remote computer system storage media including memory storage devices.

As shown in FIG. 1, computer system 154 in network environment 110 is shown in the form of a general-purpose computing device. The components of computer system 154 may include, but are not limited to, one or more computer processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 154 typically includes a variety of computer system readable media. Such media may be any available media that is accessible by computer system 154, and it includes both volatile and non-volatile media, removable and non-removable media.

System memory 128 can include computer system readable media in the form of volatile memory, such as random access memory (RAM) 130 and/or cache memory 132. Computer system 154 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein. An example application program or module is depicted in FIG. 1 as web browser 100, including a contextual website search system 102 which includes logic that is configured to generate, access, and update a webpage requested by a user. The web server 104 can be implemented as a computing storage system which stores markup language corresponding to one or more webpages. The web server 104 provides the markup language to the web browser 100, which in turn converts the markup language into an interactive webpage that can be viewed and manipulated by the user. The contextual website search system 102 allows the user the navigate the generated webpage, along with providing additional operations including, for example, automatically sharing contextual information across several different websites accessed by the user as described in greater detail below.

Computer system 154 may also communicate with one or more external devices 114 such as a keyboard, a pointing device, a display device 124, etc.; one or more devices that enable a user to interact with computer system 154; and/or any devices (e.g., network card, modem, etc.) that enable computer system 154 to communicate with one or more other computing devices. Such communication can occur via input/output (I/O) interfaces 122. Still yet, computer system 154 can communicate with one or more networks such as a local area network (LAN), a general wide area network (WAN), and/or a public network (e.g., the Internet) via network adapter 120. As depicted, network adapter 120 communicates with the other components of computer system 154 via bus 118. It should be understood that although not shown, other hardware and/or software components could be used in conjunction with computer system 154. Examples, include but are not limited to: microcode, device drivers, redundant processing units, external disk drive arrays, redundant array of independent disk (RAID) systems, tape drives, and data archival storage systems, etc.

Figure 2:
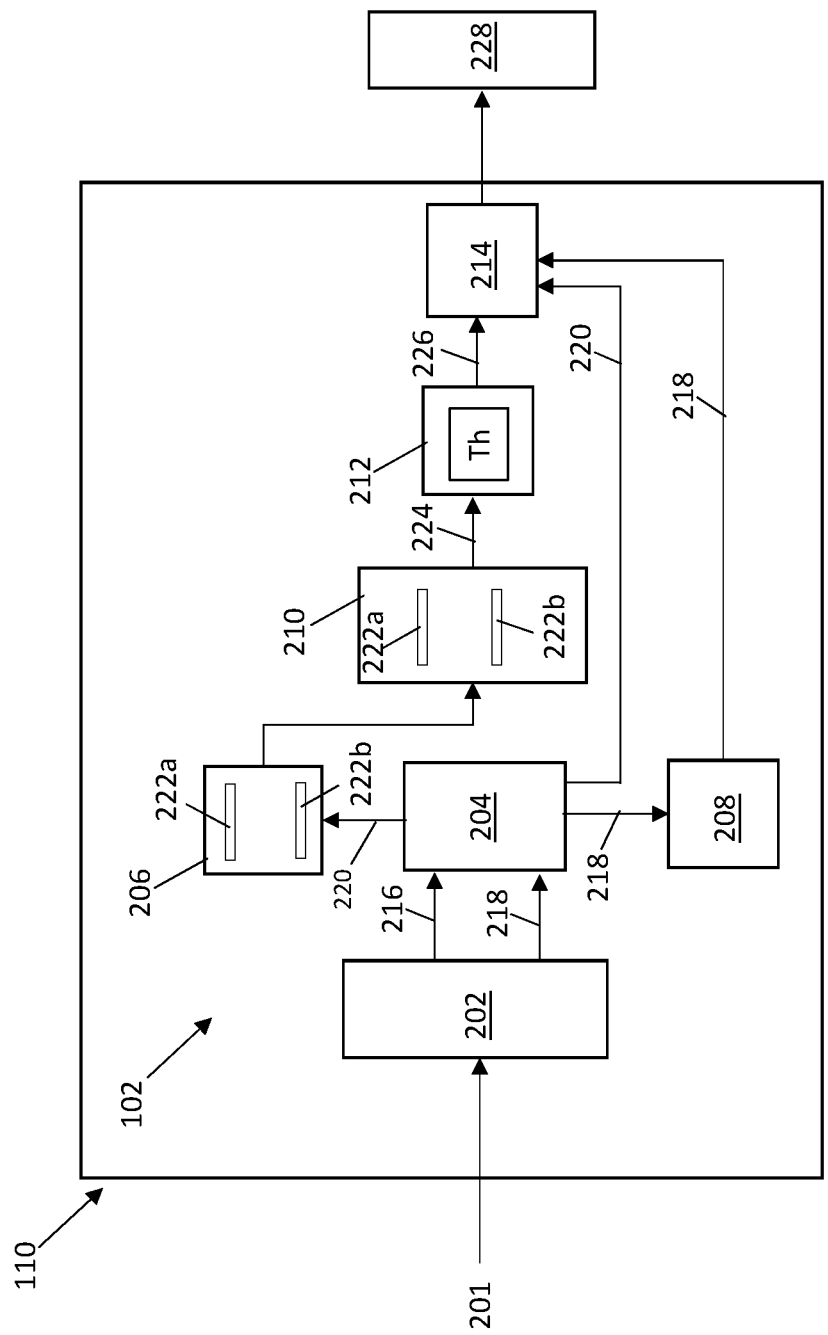
FIG. 2 is a block diagram illustrating a contextual website search system according to a non-limiting embodiment.

Turning now to FIG. 2, contextual website search system 102 capable of operating in the network environment 110 is illustrated according to a non-limiting embodiment. The contextual website search system 102 includes a user input detector unit 202, a website browser unit 204, a keyword extraction unit 206, a search data cache unit 208, a keyword comparison unit 210, a match threshold comparator unit 212, and a search data input unit 214.

The user input detector unit 202 determines the input signals 201 provided by a user when operating the computer system and, in particular, when navigating the internet and various websites. For example, a user may input an input signal 201, which includes a Uniform Resource Locator (URL) address 216 (sometimes referred to as a "web address") for accessing a website. Once at the website, the user may input a second signal 201 which includes website search data 218. The website search data can include, but is not limited to, search input strings, filter selection, or other website control data for manipulating, searching, and/or navigating the current website. The search input strings can include a particular type of product or service or category of product/service offered for sale. The filter selection can include one or more targeted characteristics associated with an advertised product such as, for example, color, size, style, etc.

When the input signal 201 includes a web address 216, the website browser unit 204 obtains the markup language (e.g., HTML language) corresponding to the web address 216, and delivers markup language 220 to the keyword extraction unit 206 and the search data input unit 214. When the website browser unit 204 detects the input signal 201 includes website search data 218, it delivers the website search data 218 to the search data cache unit 208 where it can be temporarily stored.

The keyword extraction unit 206 receives the markup language 220 of the website currently visited by the user and extracts various website keywords. The keywords can be associated with various products and/or services that are offered for sale and can indicate the context of a given website or domain. When visiting a website having a fashion-based context, for example, the website keywords may include "men's fashion", "women's fashion", "cloths", "shoes", "shirts", "ties", "seasonal styles", "shop", "denim", "pants", "shorts", "sale", etc. In at least one embodiment, the keyword extraction unit 206 "scrapes" or scans the markup language 220 to distinguish product identifiers, product names, service descriptions, etc., from HTML tags or other code operators using a natural language algorithm. The extracted keywords are then stored in memory.

In at least one embodiment, the keyword extraction unit 206 can determine and store keywords from several different website visited by the user. For example, a user can initially visit a first website, which is associated with first markup language 220. Accordingly, the keyword extraction unit 206 "scrapes" the markup language 220 of the first website and stores one or more keywords 222a corresponding to the first markup language 220. The user may then input a second web address 216 thereby visiting a subsequent website. The website browser unit 204 obtains the markup language 220 corresponding to the subsequently visited website, and delivers its markup language 220 to the keyword extraction unit 206. Accordingly, the keyword extraction unit 206 "scrapes" the markup language 220 of the second website and stores one or keywords 222b corresponding to the second markup language 220.

In at least one embodiment, a decision to store keywords 222b of a subsequent website can be made based, at least in part, on whether the user visits a subsequent website within a time period threshold. For example, the user's internet or website activities can be tracked to determine whether they leave a first website and visit a subsequent website within a set time period (e.g., 5 mins, 10 mins, etc.), referred to herein as a "time period threshold." When the user does not visit a subsequent website during the time period threshold, the website browser unit 204 can refrain from delivering markup language 220 of a subsequent website to the keyword extraction unit 206 or the keyword extraction unit 206 can refrain from scraping and storing keywords 222b of the subsequent markup language 220. In either case, subsequent keywords are not extracted and stored, for example, under the presumption that the user is no longer shopping or aiming to compare products or services offered among different webpages.

When, however, the consumer leaves the current website and visits a subsequent website within the time threshold, the website browser unit 204 can deliver the markup language 220 of the subsequent website to the keyword extraction unit 206, which in turn extracts and stores the keywords 222b associated with the subsequent website as described herein. In at least one embodiment, the website browser unit 204 can reset the time threshold each time a user visits leaves a current website and visits a subsequent website within the time threshold period. In this manner, the sharing of contextual search inputs across a plurality of websites is not limited to a particular static time period.

When a subsequent website is visited within the time period threshold, the keyword comparison unit 210 receives the keywords 222a corresponding to the previous website and the keywords 222b corresponding to the subsequent website. The previous website keywords 222a are then compared to the subsequent website keywords 222b to identify if any keyword matches exist. For example, the markup language of the previous website and the markup language of the subsequent website may both contain the keywords "shoes", "jeans", "sale", "fashion", and "style."

The match threshold comparator unit 212 receives the number of matches 224 determined by the keyword comparison unit 210. The number of matches 224 is then output to the compared to a match threshold (Th). The match threshold can be set as a threshold number e.g., 4 matches, or a threshold percentage, e.g., the number of matches is greater than X % with respect to set a number of extracted keywords. Based on the comparison, the match threshold comparator unit 212 outputs a search input share signal 226.

The result of comparison between the number of keyword matches and the match threshold effectively predicts a level of commonality or relatedness between the previous website and the subsequent website. In this manner, the contextual website search system 102 can determine whether the cached search data of the previous website can be effectively applied to the subsequent website to obtain similar search results provided by the previous website. For example, when the number of keyword matches exceeds the match threshold, it is determined that the user is attempting to perform similar searches at two different but related websites. Accordingly, the cached search data 218 can be used to perform a similar search at the subsequent website. When, however, the number of keyword matches does not exceed the match threshold, it is determined that the user's activity at the second website is likely unrelated to the activity performed at the previous website.

The search data input unit 214 receives the search input share signal 226, the cached website search data 218 associated with the previous website, and the markup language 220 of the subsequent website (which is now the current website visited by the user). When the number of matches 224 exceeds the match threshold, the search input share signal 226 commands the search data input unit 214 to automatically apply the cached website search data 218 to the subsequent website. In at least one embodiment, the search data input unit 214 can automatically add the cached website search data 218 into the markup language 220. Accordingly, when loading the subsequent website, the product search fields are automatically filled with the cached search string(s) and/or the product filters are automatically set according to the cached filter data. In this manner, the context of the user's search from the previous website is automatically applied to the subsequent website and presented to the user on a display unit 228, thereby providing the user with significant time savings and convenience.

When the number of matches 224 does not exceed the match threshold, the search input share signal 226 commands the search data input unit 214 to refrain from applying the cached website search data 218 to the subsequent website. In this manner, when a user has completed a series of related website searches and has moved on to a new or independent website activity, the user can visit a subsequent website without the need to address non-contextual search data or search data that is unrelated to the new website activity.

Figure 3:
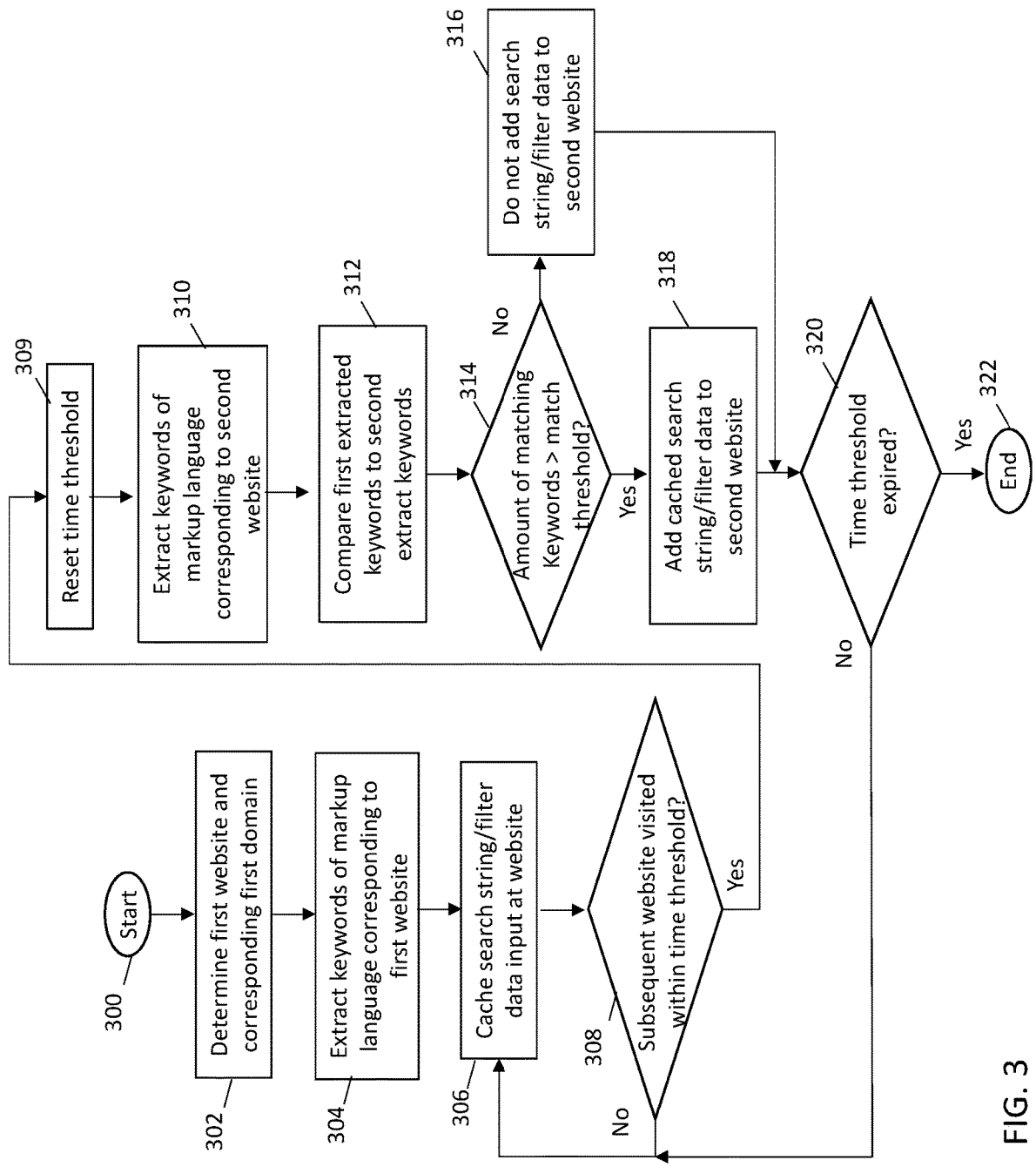
FIG. 3 is a flow diagram illustrating a method of sharing a contextual search input across a plurality of websites according to a non-limiting embodiment.

With reference now to FIG. 3, a method of sharing a contextual search input across a plurality of websites is illustrated according to a non-limiting embodiment. The method begins at operation 300, and a first website visited by a user or consumer is determined at operation 302. At operation 304, keywords of the markup language (e.g., HTML language) corresponding to the first website are extracted. In at least one non-limiting embodiment, a natural language algorithm is utilized to "scrape" or scan the first website and extract the first website keywords. At operation 306, the search string(s) and/or filter data input to the first website are cached. At operation 308, a determination is made as to whether the consumer visits a subsequent second website within a time period threshold. For example, a consumer can be tracked to determine whether they from leaving the first website and visit a subsequent second website within a time period (e.g., 5 mins, 10 mins, etc.) When the consumer does not leave the first website or does not visit a subsequent website within the time threshold, the method returns to operation 306 and continues to cache the search string(s)/filter data input to the first website.

When, however, the consumer visits a subsequent second website within the time period threshold, the time threshold is reset at operation 309, and the keywords of the markup language (e.g., HTML language) corresponding to the second website are extracted operation 310. As described above, a natural language algorithm can be utilized to "scrape" or scan the second website and extract the second website keywords. At operation 312, the keywords extracted from the first website are compared to the keywords extracted from the second website. The comparison determines an amount of matching keywords between the extracted keywords from the first website and the extracted keywords from the second website. At operation 314, the amount of matching keywords is compared to a match threshold value or match threshold percentage. When the amount of matching keywords does not exceed the match threshold, the cached search string(s) and filter data are not added or applied to the second website at operation 316. When, however, the amount of matching keywords exceeds the match threshold, the cached search string(s) and/or filter data are added into the second website at operation 318. In at least one embodiment, the matching keywords can be automatically input to the search field of the second website and/or filters corresponding to the matching keywords can automatically be set in the second website. At operation 320, a determination is made as to whether the time threshold has expired. If so, the method ends at operation 322. Otherwise, the method returns to operation 306 and to cache the search string data and/or the filter data input at the subsequent website. The operations of the method described above can be continuously repeated until the simulation reaches its end without incurring a logic fault.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   a processor configured to predict a level of commonality between a first website and a second website, to determine a time period during which the second website is accessed after exiting the first website, to extract keywords from the second website in response to the time period being within a time period threshold and refraining from extracting the keywords from the second website in response to the time period exceeding the time period threshold, and to automatically apply cached search data input at the first website to the second website based at least in part on the level of commonality, the level of commonality based at least in part on matching keywords extracted within the time period during which the second website is accessed after exiting the first website and a comparison between a number of the matching keywords obtained from the first and second websites and a match threshold value; and a display unit configured to display the second website, wherein the second website is displayed along with the cached search data in response to the number of the matching keywords exceeding the match threshold value and wherein the second website is displayed without the cached search data in response to the number of the matching keywords not exceeding the match threshold value, wherein the cached search data includes a search string input at the first website and filter selection data input at the first website, the filter selection data corresponding to a first product provided by the first website, and in response to the time period satisfying a time period threshold, the processor determines the first product is in common with a second product provided by the second website and applies the filter selection data input at the first website to the second website.

2. The computer system of claim 1, wherein the number of matching keywords is determined according to a comparison between a first number of keywords extracted from first markup language corresponding to the first website and a second number of keywords extracted from second markup language corresponding to the second website.

3. The computer system of claim 1, wherein the second website is determined to have a high commonality with the first website when the number of matching keywords exceeds the match threshold value, and wherein the second website is determined to have a low commonality with the first website when the number of matching keywords does not exceed the match threshold value.

4. The computer system of claim 3, wherein the cached search data is automatically applied to the second website in response to determining the high commonality, and wherein the cached search data is not applied to the second website in response to determining the low commonality.

5. A method of sharing a contextual search input across a plurality of websites, the method comprising:

predicting, via a processor, a level of commonality between a first website and a second website, the level of commonality based at least in part on time period during which the second website is accessed after exiting the first website;

determining a time period during which the second website is accessed after exiting the first website;

extracting keywords from the second website in response to the time period being within a time period threshold and refraining from extracting the keywords from the second website in response to the time period exceeding the time period threshold;

determining the level of commonality based at least in part on matching keywords extracted from the second website within the time period and a comparison between a number of the matching keywords obtained from the first and second websites and a match threshold value;

automatically applying, via the processor, cached search data input at the first website to the second website based at least in part on the level of commonality, the cached search data including a search string input at the first website and filter selection data input at the first website, wherein the filter selection data corresponds to first products provided by the first website;

displaying, via a display unit, the second website along with the cached search data in response to the number of the matching keywords exceeding the match threshold value, and refraining from applying the cached search data along with the second web site in response to the number of the matching keywords not exceeding the match threshold value; and in response to the time period satisfying a time period threshold, determining by the processor a first product is in common with a second product provided by the second website and applies the filter selection data input at the first website to the second website.

6. The method of claim 5, further comprising determining the number of matching keywords according to a comparison between a first number of keywords extracted from first markup language corresponding to the first website and a second number of keywords extracted from second markup language corresponding to the second website.

7. The method of claim 5, further comprising:

determining the second website has a high commonality with the first website when the number of matching keywords exceeds the match threshold value; and determining the second website has a low commonality with the first website when the number of matching keywords does not exceed the match threshold value.

8. The method of claim 7, further comprising:

automatically applying the cached search data to the second website in response to determining the high commonality; and refraining from applying the cached search data to the second website in response to determining the low commonality.

9. A computer program product comprising a computer readable storage medium having program instructions embodied therewith the program instructions executable by a computer processor to cause the computer processor to perform a method of sharing a contextual search input across a plurality of websites, the method comprising:

predicting, via a processor, a level of commonality between a first website and a second website, the level of commonality based at least in part on time period during which the second website is accessed after exiting the first website;

determining a time period during which the second website is accessed after exiting the first website;

extracting keywords from the second website in response to the time period being within a time period threshold and refraining from extracting the keywords from the second website in response to the time period exceeding the time period threshold;

determining the level of commonality based at least in part on matching keywords extracted from the second website within the time period and a comparison between a number of the matching keywords obtained from the first and second websites and a match threshold value;

automatically applying, via the processor, cached search data input at the first website to the second website based at least in part on the level of commonality, the cached search data including a search string input at the first website and filter selection data input at the first website, wherein the filter selection data corresponds to first products provided by the first website;

displaying, via a display unit, the second website along with the cached search data in response to the number of the matching keywords exceeding the match threshold value, and refraining from applying the cached search data along with the second web site in response to the number of the matching keywords not exceeding the match threshold value; and in response to the time period satisfying a time period threshold, determining by the processor a first product is in common with a second product provided by the second website and applies the filter selection data input at the first website to the second website.

10. The computer program product of claim 9, further comprising determining the number of matching keywords according to a comparison between a first number of keywords extracted from first markup language corresponding to the first website and a second number of keywords extracted from second markup language corresponding to the second website.

11. The computer program product of claim 9, further comprising:

determining the second website has a high commonality with the first website when the number of matching keywords exceeds the match threshold value; and determining the second website has a low commonality with the first website when the number of matching keywords does not exceed the match threshold value.

12. The computer program product of claim 11, further comprising:

automatically applying the cached search data to the second website in response to determining the high commonality; and refraining from applying the cached search data to the second website in response to determining the low commonality.

\* \* \* \* \*